(No Model.)
H. W. FISHEL.
BOUTONNIERE.
No. 502,853. Patented Aug. 8, 1893.
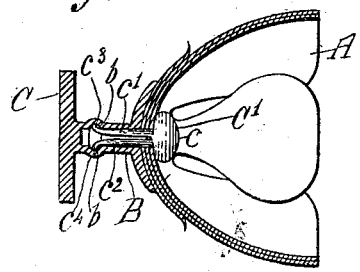
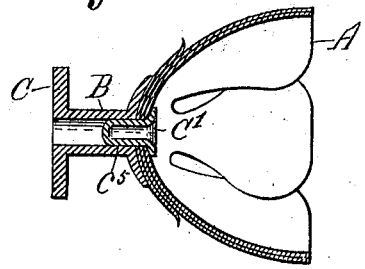
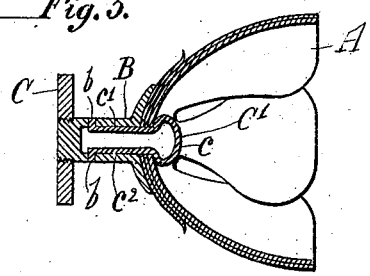
WITNESSES:
William M. Iliff
David A. Smith
INVENTOR
Henry W. Fishel
BY
Edwin H. Brown
his ATTORNEY

UNITED STATES PATENT OFFICE.

HENRY W. FISHEL, OF NEW YORK, N. Y.

BOUTONNIÈRE.

SPECIFICATION forming part of Letters Patent No. 502,853, dated August 8, 1893.

Application filed May 10, 1893. Serial No. 473,670. (No specimens.)

*To all whom it may concern:*

Be it known that I, HENRY W. FISHEL, of the city, county, and State of New York, have invented a certain new and useful Improvement in Boutonnières, of which the following is a specification.

I will describe a boutonnière, embodying my improvement and then point out the novel features in the claims.

In the accompanying drawings, Figure 1 is a central longitudinal section of a boutonnière embodying my improvement. Fig. 2 is a perspective view of one of the parts detached. Fig. 3 is a central longitudinal section of a boutonnière of modified form, embodying my improvement. Fig. 4 is a perspective view of one of the parts detached. Fig. 5 is a central longitudinal section of another boutonnière of modified form, embodying the improvement.

Similar letters of reference designate corresponding parts in all the figures.

Referring first to Figs. 1 and 2, A designates an artificial flower, which may be made of any suitable material, and an imitation of any desired natural flower.

B designates a stem, or post, which is hollow at least at one end, and at the other end is provided with a back-plate or shoe C, which may be made in the form of a laterally extending flange, although its construction is immaterial.

C′ designates a pin or engaging device having a head $c$, at one end and two diverging portions $c'$, $c^2$, which may be made of spring metal. In the hollow of the stem or post B are recesses $b$. Instead of separate recesses, there may be a continuous groove. The pin or engaging device is inserted through a hole in the center of the flower, when its diverging portions $c'$, $c^2$ will be forced into the hollow of the stem or post B. These diverging portions are provided with angular projections $c^3$, $c^4$, to engage with the recesses or groove in the stem or post, or else their ends will be extended outwardly for this purpose. When the diverging portions, $c'$, $c^2$, of the pin are made resilient, the flower will be detachable, and if they are made rigid and expanded after entering the stem or post, the flower will not be detachable. In Figs. 3 and 4, I have shown a similar construction, except that the pin C has a tubular body $c^5$, which may be expanded outwardly into frictional engagement with the hollow of the stem or post. The latter need not be provided with recesses or a groove in this example of my improvement.

In Fig. 5, the construction represented is very similar to that shown in Figs. 1 and 2, but here the ends of the diverging portions $c'$, $c^2$ of the pin C′ are extended abruptly outward and made to engage with holes or recesses $b$ in the stem or post B; these recesses being of such a character that the pin cannot be disengaged from them by a longitudinal pull.

I have shown in Fig. 5 that the back-plate or shoe C may consist of an independent plate screwed onto the stem or post.

What I claim as my invention, and desire to secure by Letters Patent, is—

1. In a boutonnière, the combination of a stem or post having a hollow at one end, an artificial flower or analogous device, and a pin passing through the latter and expanded into the hollow of the stem or post, substantially as specified.

2. In a boutonnière, the combination of a stem or post, having a hollow at one end, an artificial flower or analogous device, and a pin having diverging portions which, after being passed through the flower or like device, is expanded outwardly to engage recesses or a groove in the hollow of the stem or post, substantially as specified.

In testimony whereof I have signed my name to this specification in the presence of two subscribing witnesses.

HENRY W. FISHEL.

Witnesses:
ANTHONY GREF,
WILLIAM M. ILIFF.